US012798002B2

(12) United States Patent
Scheible et al.

(10) Patent No.: US 12,798,002 B2
(45) Date of Patent: Nov. 17, 2026

(54) LASER WELDING FOR CORNER JOINS OF WORKPIECE PARTS

(71) Applicant: TRUMPF Laser-und Systemtechnik GmbH, Ditzingen (DE)

(72) Inventors: Philipp Scheible, Ditzingen (DE); Johannes Seebach, Stuttgart (DE); Oliver Bocksrocker, Sachsenheim (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 1254 days.

(21) Appl. No.: 17/719,445

(22) Filed: Apr. 13, 2022

(65) Prior Publication Data

US 2022/0234139 A1 Jul. 28, 2022

Related U.S. Application Data

(63) Continuation of application No. PCT/EP2020/079269, filed on Oct. 16, 2020.

(30) Foreign Application Priority Data

Oct. 17, 2019 (DE) .................... 10 2019 215 968.0

(51) Int. Cl.
*B23K 26/21* (2014.01)
*B23K 26/073* (2006.01)
(Continued)

(52) U.S. Cl.
CPC .......... *B23K 26/21* (2015.10); *B23K 26/0734* (2013.01); *B23K 26/082* (2015.10);
(Continued)

(58) Field of Classification Search
CPC .. B23K 26/21; B23K 26/0734; B23K 26/082; B23K 26/064; B23K 26/206;
(Continued)

(56) References Cited

U.S. PATENT DOCUMENTS 8,890,022 B2 * 11/2014 Beck ..................... B23K 26/24 219/121.64
2006/0219673 A1 10/2006 Varnham et al.
(Continued)

FOREIGN PATENT DOCUMENTS

CN 106918876 A 7/2017
CN 107864672 A 3/2018
(Continued)

OTHER PUBLICATIONS

Maina et al. High surface quality welding of aluminum using adjustable ring-mode fiber laser, Journal of Materials Processing Technology, vol. 258, pp. 180-188 (Year: 2018).*

*Primary Examiner* — Topaz L. Elliott
*Assistant Examiner* — Daniel Ward Hatten
(74) *Attorney, Agent, or Firm* — LEYDIG VOIT & MAYER LTD.

(57) ABSTRACT

A method for laser welding of a workpiece includes welding at a corner joint of two workpiece parts of the workpiece by a welding laser beam to create an aluminum connection between the two workpiece parts, and feeding an output laser beam into a first end of a multiclad fiber to generate the welding laser beam. The multiclad fiber comprises at least a core fiber and a ring fiber surrounding the core fiber. A first portion LK of a laser power output of the output laser beam is fed into the core fiber, and a second portion LR of the laser power output of the output laser beam is fed into the ring fiber. A second end of the multiclad fiber is reproduced on the workpiece. The method further includes welding the workpiece by deep welding.

17 Claims, 9 Drawing Sheets

(51) Int. Cl.

| | |
|---|---|
| ***B23K 26/082*** | (2014.01) |
| ***B23K 101/36*** | (2006.01) |
| ***B23K 103/10*** | (2006.01) |
| ***G02B 6/26*** | (2006.01) |

(52) U.S. Cl.
CPC .......... *G02B 6/262* (2013.01); *B23K 2101/36* (2018.08); *B23K 2103/10* (2018.08)

(58) Field of Classification Search
CPC .... B23K 26/242; B23K 26/24; B23K 26/073; B23K 2101/36; B23K 2103/10; G02B 6/262
USPC .................................................... 219/121.64
See application file for complete search history.

(56) References Cited

U.S. PATENT DOCUMENTS

| | | | | |
|---|---|---|---|---|
| 2013/0223792 | A1 | 8/2013 | Huber et al. | |
| 2013/0270981 | A1* | 10/2013 | Shishido | B23K 26/26 29/505 |
| 2015/0321286 | A1 | 11/2015 | Heinemann et al. | |
| 2015/0349303 | A1 | 12/2015 | Umeyama | |
| 2016/0116679 | A1 | 4/2016 | Muendel et al. | |
| 2016/0254501 | A1 | 9/2016 | Saimaru et al. | |
| 2017/0028507 | A1 | 2/2017 | Tsukui | |
| 2017/0144249 | A1* | 5/2017 | Fujiwara | B23K 33/004 |
| 2017/0182599 | A1 | 6/2017 | Tsukui | |
| 2017/0297145 | A1* | 10/2017 | Hosomi | B23K 26/242 |
| 2017/0334021 | A1 | 11/2017 | Tsukui | |
| 2018/0120506 | A1 | 5/2018 | Lecler et al. | |
| 2018/0185960 | A1 | 7/2018 | Coskun et al. | |
| 2019/0118299 | A1 | 4/2019 | Kangastupa | |
| 2019/0258009 | A1 | 8/2019 | Huber et al. | |
| 2020/0171603 | A1* | 6/2020 | Yang | B23K 26/244 |
| 2020/0254562 | A1* | 8/2020 | Brescoe | G02B 6/02042 |
| 2021/0060702 | A1* | 3/2021 | Telenko, Jr. | B23K 26/14 |
| 2022/0072662 | A1* | 3/2022 | Wang | B23K 26/38 |
| 2023/0030159 | A1* | 2/2023 | Haug | B23K 26/0608 |

FOREIGN PATENT DOCUMENTS

| | | | | |
|---|---|---|---|---|
| DE | 102010003750 | A1 | | 10/2011 |
| EP | 1037290 | A1 | | 9/2000 |
| JP | H09216078 | A | * | 8/1997 |
| JP | 2007518566 | A | | 7/2007 |
| JP | 2013180295 | A | | 9/2013 |
| JP | 2015500571 | A | | 1/2015 |
| JP | 2016503348 | A | | 2/2016 |
| JP | 2018527184 | A | | 9/2018 |
| WO | WO 2019129917 | A1 | | 7/2019 |

* cited by examiner

LASER WELDING FOR CORNER JOINS OF WORKPIECE PARTS

CROSS REFERENCE TO RELATED APPLICATIONS

This application is a continuation of International Application No. PCT/EP2020/079269 (WO 2021/074419 A1), filed on Oct. 16, 2020, and claims benefit to German Patent Application No. DE 10 2019 215 968.0, filed on Oct. 17, 2019. The aforementioned applications are hereby incorporated by reference herein.

FIELD

Embodiments of the present invention relate to a laser welding method for corner joins of workpiece parts.

BACKGROUND

US 2017/0334021 A1 discloses a laser welding system used in the production of electronic devices such as batteries, comprising a laser source for generating a laser beam having a beam profile. To modify the beam profile, the laser welding system comprises beam-shaping means, for example optical elements for diffraction of the laser beam, and shielding components, which make it possible to shield at least part of the laser beam. The targeted beam shaping is intended to bring about a reduction in the power of the laser beam that is required for the welding and in undesired side effects.

DE 10 2010 003 750 A1 discloses a method for modifying the profile of a laser beam. The laser beam is coupled into the one fiber end of a multiclad fiber and is coupled out of the other end of the multiclad fiber. In the process, the incident laser beam is coupled at least into the inner fiber core of the multiclad fiber and/or into an outer ring core of the multiclad fiber. This brings about a modification of the profile of the laser beam after it is coupled out compared to the laser beam before it is coupled in.

In the case of welding together corner joins of workpieces by methods previously used for this, instabilities, for example in the form of pores, may be produced in the workpiece and eject spatters of the molten material.

SUMMARY

Embodiments of the present invention provide a method for laser welding of a workpiece. The method includes welding at a corner joint of two workpiece parts of the workpiece by a welding laser beam to create an aluminum connection between the two workpiece parts, and feeding an output laser beam into a first end of a multiclad fiber to generate the welding laser beam. The multiclad fiber comprises at least a core fiber and a ring fiber surrounding the core fiber. A first portion LK of a laser power output of the output laser beam is fed into the core fiber, and a second portion LR of the laser power output of the output laser beam is fed into the ring fiber. A second end of the multiclad fiber is reproduced on the workpiece. The method further includes welding the workpiece by deep welding.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
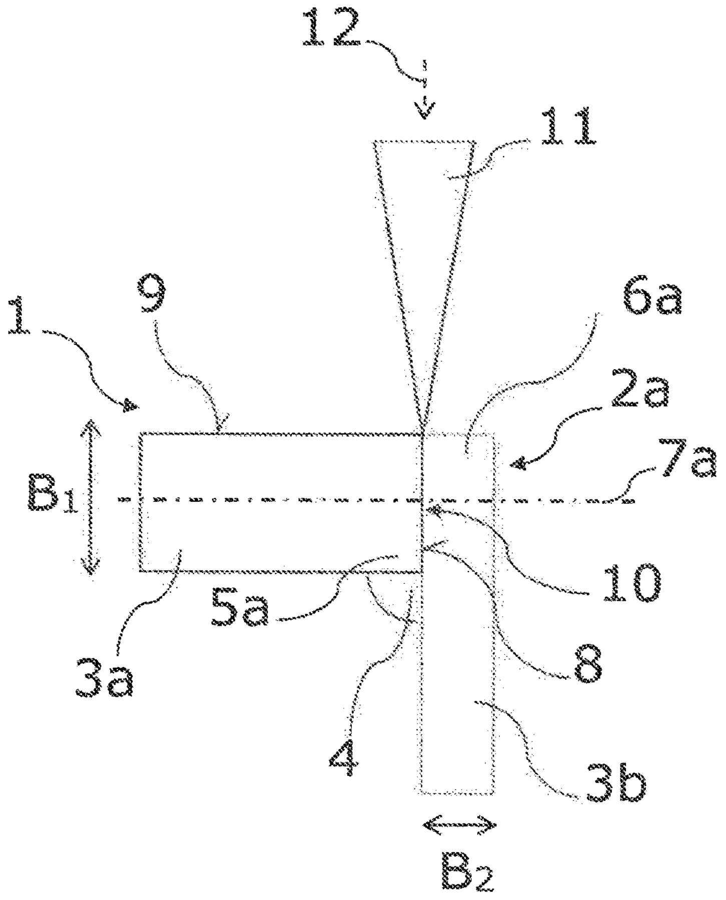
FIG. 1*a* shows a schematic view of a welding situation of a first corner joint and of a laser beam for welding the corner joint according to embodiments of the present invention.

Embodiments of the present invention provide a laser welding method for stable formation of corner joins of workpiece parts without the production of spatters of the metal melt, as are valued for battery housings.

Embodiments of the present invention provide a method for laser welding a workpiece, with a plain butt joint weld being created by welding at the corner joint of two workpiece parts of the workpiece by means of a welding laser beam, as a result of which an aluminum connection is created between the workpiece parts, with, to generate the welding laser beam, an output laser beam being fed into a first end of a multiclad fiber, in particular a 2-in-1 fiber, with the multiclad fiber comprising at least a core fiber and a ring fiber surrounding the latter, with a first portion LK of the laser power output of the output laser beam being fed into the core fiber and a second portion LR of the laser power output of the output laser beam being fed into the ring fiber, with a second end of the multiclad fiber being reproduced on the workpiece, and with the workpiece being laser welded by deep welding.

The welding method according to embodiments of the present invention, in particular the combination according to embodiments of the present invention of workpiece geometry, workpiece material, beam shaping at the laser beam and procedure, brings about stable weld connections combined with a reduction in spatters. The weld in the form of a plain butt joint weld is distinguished by a small notch effect and an undisrupted force flow through the weld. This results in high stability of the plain butt joint weld. Aluminum as a material has a comparatively low weight along with high strength and durability, and therefore the stability of the welded connection is also increased as a result. The deep welding obtains high welding-in depths. The laser beam exiting the multiclad fiber has a beam cross section having a core beam, which is emitted by the core fiber, and a ring beam, which is emitted by the ring fiber. This minimizes spatter formation when deep welding the plain butt joint weld in the aluminum material. Moreover, a weld is created that has a smooth weld upper bead and high gas tightness, this having proved well suitable for the manufacture of battery housings.

At a corner joint, in particular two workpiece parts bear against one another by way of their ends at an angle, preferably at a right angle or an approximately right angle of 75° to 105°. When there is a plain butt joint weld at the corner joint, the workpiece parts are in particular arranged in such a way that an extension of the longitudinal axis of a first workpiece part passes through an end of a second workpiece part, with the plain butt joint weld extending over the entire width of the first workpiece part transversely, in particular perpendicularly, with respect to the longitudinal axis.

The abutting area of the workpiece parts is in particular parallel or virtually parallel to the beam direction (beam propagation direction) of the welding laser beam. In particular, the abutting area of the workpiece parts is aligned at a maximum angle of 15° to −15°, preferably 5° to −5°, in relation to the beam direction of the laser beam. Typically, one of the workpiece parts extends perpendicularly away from the abutting area, and one of the workpiece parts extends parallel to the abutting area. At the entrance side of the welding laser beam on the workpiece, the workpiece parts are in line typically with respect to the beam direction. The workpiece parts consist substantially of aluminum and may comprise a plastics coating, for instance for electrical insulation purposes.

In the case of the welding method according to embodiments of the present invention, in the deep welding mode lasers with a comparatively high power output density are used, which results in the laser creating vapor during the welding. The vapor displaces the melt produced during the welding. This results in the formation of a deep, vapor-filled hole, the vapor capillary. The metal melt flows around the vapor capillary and solidifies on the rear side.

In the course of laser welding without a multiclad fiber for generating the laser beam, an excess pressure often builds up in vapor capillaries in the workpiece, this resulting in protuberances of the vapor capillaries. These protuberances increase in size and open explosively, melt being ejected in the form of spatters. The fluctuations of the metal melt on the side of the vapor capillaries that faces the laser beam also often result in spatters of the metal melt. Sharp edges, which prevent the flow of the metal melt and therefore promote the occurrence of spatters, can form in the vapor capillaries. The protuberances may moreover result in pores in the workpiece.

The multiclad fiber used according to embodiments of the present invention for the purpose of beam shaping has at least a core fiber (solid-profile fiber) and a ring fiber (hollow-profile fiber), which surrounds the core fiber. The ring fiber is in particular in the form of a peripherally closed fiber with a recess. The core fiber and the ring fiber may have any desired cross-sectional profiles, for example in a square shape. The core fiber and the ring fiber preferably have a cross section in the shape of a circle or a circular ring. The multiclad fiber is preferably in the form of a 2-in-1 fiber having the core fiber and a ring fiber. The laser beam exiting the multiclad fiber has a beam cross section having a core beam, which is emitted by the core fiber, and a ring beam, which is emitted by the ring fiber. The intensities of the core beam and the ring beam are determined by the first portion LK and the second portion LR, respectively, of the laser power output of the output laser beam that is fed in.

The beam profile of the welding laser beam is modified in comparison with the output laser beam to the effect that the interaction of a determined ring intensity with a determined core intensity modifies the coupling of energy into the workpiece such that the manifestation of the vapor capillary and the weld pool dynamics are influenced. In this way, welding with beam shaping, in particular low-spatter deep welding, with very high advancement rates and weld upper bead quality is made possible, as is the case in heat conduction welding.

The ring beam may in particular have the effect that the opening of the vapor capillary on that side of the workpiece that is irradiated by the laser beam is increased and the emergence of gases from the vapor capillary is facilitated. The ring intensity thus further opens the vapor capillary in the upper part, with the result that the metal vapor can flow out without obstruction or virtually without obstruction. This largely suppresses the formation of protuberances in the vapor capillary and the production of spatters. Spatter formation is minimized, since the pressure of the gas in the vapor capillary and a corresponding action on the weld pool are reduced. The ring beam additionally transmits a pulse from above (in the propagation direction of the laser beam) into the weld pool, the direction of which pulse is counter to the acceleration of molten material on the rear side of the vapor capillary and as a result also reduces spatter formation. Fluctuations favoring the production of spatters are suppressed by the ring beam. The heat conduction in the weld results in a further expansion of the weld. A weld which has a smooth weld upper bead (comparable with heat conduction weldings) and high gas tightness is created.

By means of high-speed recordings, the inventors have observed that n it is possible to achieve a reduction in spatter formation by up to 90% in comparison with the prior art (without the beam shaping according to embodiments of the present invention). The inventors have additionally observed this significant reduction in spatter formation at advancement speeds that were higher by a factor of 7.5 (approx. 30 m/min) than in the case of the prior art (approx. 4 m/min). The inventors have also established that the use of the technology according to embodiments of the present invention can achieve significantly smoother weld upper beads than in the case of welds that were welded using other welding methods.

The method according to embodiments of the present invention is suitable for the production of stable corner joins in battery housings with a low risk of short circuiting and high gas tightness by virtue of the use of the plain butt joint weld at the corner joint, the use of aluminum and the deep welding with a multiclad fiber.

In an embodiment of the method according to embodiments of the present invention, the first portion LK of the laser power output for the core fiber and the second portion LR of the laser power output for the ring fiber are selected with 0.15≤LK/(LK+LR)≤0.50, preferably 0.25≤LK/(LK+LR)≤0.45, particularly preferably LK/(LK+LR)=0.35.

These respective fractions of the laser power output for the core fiber and the ring fiber effect a welding process with a large penetration depth combined with avoidance of spatters and have proven suitable in the manufacture of battery housings. In the case of a lower fraction of the laser power output for the core fiber, the fraction of the laser power output for the ring fiber dominates, with the result that the laser welding process is again comparable with the case of laser welding using a homogeneous fiber. This also applies for a larger fraction of the laser power output for the core fiber as specified above, it then being the case that the fraction of the laser power output for the core fiber dominates in comparison with the fraction for the ring fiber.

An embodiment in which the laser welding is effected at an advancement speed v with v≥7 m/min, in particular with v≥10 m/min, preferably v≥20 m/min, particularly preferably v≥30 m/min, is preferred. These advancement speeds can be readily realized with low spatter in the case of typical laser power outputs of 2 to 6 kW, a wavelength of 1030 nm, along with a typical workpiece thickness at the joint (of the workpiece part that is smaller in the beam direction) of 0.5 mm-2 mm.

Further preferable is an embodiment in which the second end of the multiclad fiber is reproduced on the workpiece enlarged by an enlargement factor VF, with VF>1.0, in particular with VF≥1.5, preferably VF≥2.0. With such an enlargement, it is possible to obtain a comparatively small divergence angle of the laser beam; the reflection of the laser beam at the workpiece is minimized. A small divergence angle also makes it possible to better avoid the combustion of insulating material. The welding process can be carried out with a greater tolerance in terms of the distance of the focus of the welding laser beam from the surface of the workpiece.

Likewise preferred is an embodiment in which the output laser beam is generated by means of a solid-state laser, in particular a disk laser. Solid-state lasers are cost effective and have proven successful. Disk lasers are distinguished by good possible ways of cooling the laser crystal during operation, this having a positive effect on the focusability of the laser beam.

Also preferred is an embodiment in which the multiclad fiber is selected such that, for a diameter DK of the core fiber and a diameter DR of the ring fiber, the following holds true: 2.5≤DR/DK≤6, preferably 3≤DR/DK≤5. Typically, for the core fiber it holds true that 50 μm≤DK≤250 μm or 100 μm≤DK≤200 μm. Typically, for the ring fiber it furthermore holds true that 100 μm≤DR≤1000 μm or 150 μm≤DK≤900 μm or 150 μm≤DR≤500 μm. With these diameter ratios, it is possible to carry out the welding process with comparatively short process times.

Furthermore advantageous is an embodiment in which the welding laser beam with its focus in the beam propagation direction has a maximum height offset MHO with respect to the surface of the workpiece, with |MHO|≤1.5 mm, preferably |MHO|≤1.0 mm, particularly preferably |MHO|≤0.5 mm. Within this range of the height offset, a local annular minimum of the intensity distribution manifests between the core beam and the ring beam. In particular, this has a positive effect on the prevention of spatters during the welding process.

Likewise advantageous is an embodiment in which the welding laser beam has a maximum lateral offset MLO on the workpiece with respect to an abutting area of the workpiece parts, with |MLO|≤0.2 mm, preferably |MLO|≤0.1 mm. Within this range of the lateral offset MLO, a comparatively smooth weld upper bead, which is in particular round over the resulting corner, is obtained during the welding process.

An embodiment in which the workpiece parts are clamped to one another over their surface area during the laser welding is advantageous, with a maximum gap width MS between the workpiece parts being maintained, with MS≤0.1 mm. At these gap widths, a homogeneous distribution, with few pores, of the material in the weld is created during the welding.

Additionally preferred is a variant in which the workpiece parts at the corner joint in the beam propagation direction of the welding laser beam are arranged in relation to one another in line or with a step having a step height SH, with SH≤0.3 mm, preferably SH≤0.2 mm, particularly preferably SH≤0.1 mm. Such a maximum step height has made it possible to manufacture welds of good quality.

Embodiments of the present invention also includes the use of the method according to one of the preceding embodiments for manufacturing a battery housing, the workpiece parts being parts of the battery housing, in particular one of the workpieces being a cap which closes off the battery housing. The parts of the battery housing can be connected by the method in a particularly stable and quick manner without spatters. The manufactured housings are reliably tight, in particular gastight.

Embodiments of the present invention relate to the creation of a plain butt joint weld at the corner joint with aluminum connections, a joining situation as is typically present in battery housings (what are known as "can caps"). When battery cell housings are being laser welded, on account of the high advancement speeds required during the welding process it is often possible for weld spatters and non-uniform weld upper beads to be produced. Embodiments of the present invention, which provides a beam profile created by means of a multiclad fiber, smooths the weld and minimizes spatter formation, this resulting in a lower risk of short circuiting and higher tightness. As a result, an increase which is reliable in terms of the production in the advancement speeds compared to the prior art is clearly possible.

FIG. 1*a* shows a workpiece 1 having a first corner joint 2*a*, which comprises a first workpiece part 3*a* and a second workpiece part 3*b*. The first workpiece part 3*a* in this instance has a larger width $B_1$ than a width $B_2$ of the second workpiece part 3*b*. The workpiece parts 3*a*, 3*b* bear against one another by way of a right-angled inner corner 4. A blunt end 5*a* of the first workpiece part 3*a* is arranged at an end 6*a* of the second workpiece part 3*b*. The extension of the longitudinal axis 7*a* of the first workpiece part 3*a* passes through the end 6a of the second workpiece part 3b. In order to create a weld in the form of a plain butt joint weld 8, the surface 9 of the workpiece 1 is irradiated by means of a welding laser beam 11 at the abutting area 10, at which the workpiece parts 3a, 3b bear against one another. The welding laser beam 11 is coupled out of a multiclad fiber (see FIG. 2). The abutting area 10 of the workpiece parts 3a, 3b lies parallel to the beam propagation direction 12 of the welding laser beam 11. The first (wider) workpiece part 3a extends perpendicularly away from the abutting area 10, and the second (narrower) workpiece part 3b extends parallel to the abutting area 10. At the entrance side of the welding laser beam 11 on the workpiece 1, the workpiece parts 3a, 3b are in line with respect to the beam propagation direction 12. The welding laser beam 11 is radiated in from that side of the workpiece 1 comprising the two workpiece parts 3a, 3b that faces away from the right-angled inner corner 4 of the workpiece 1. The workpiece parts 3a, 3b are respectively manufactured from an aluminum-containing material, in particular aluminum 3003, and typically have a width $B_1$, $B_2$ of 0.5 mm to 2.0 mm. The arrangement of the workpiece parts 3a, 3b constitutes in particular a schematic representation of a corner join of a battery housing.

Figure 1B:
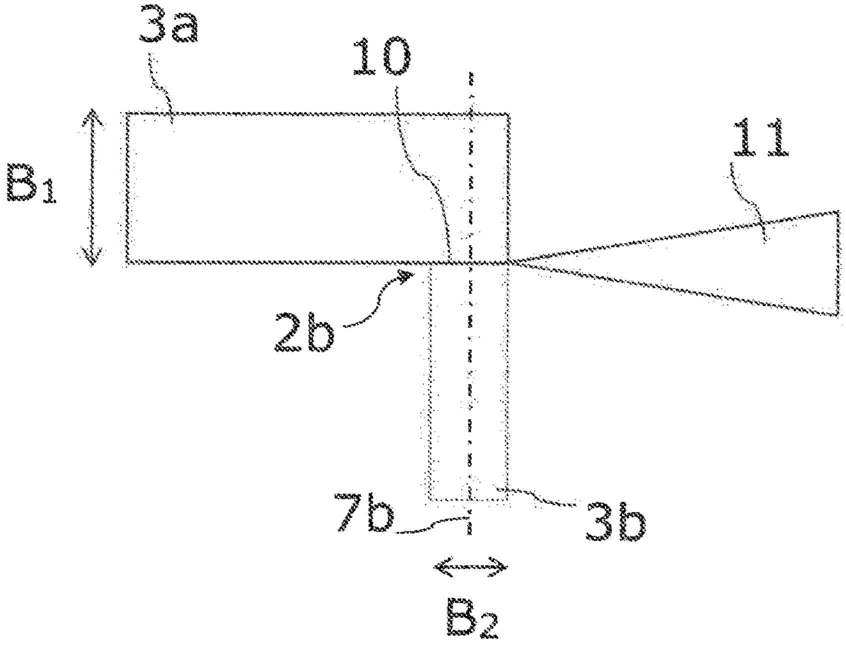
FIG. 1*b* shows a schematic view of a welding situation of a second corner joint and of a laser beam for welding the corner joint according to embodiments of the present invention.

The welding situation shown in FIG. 1b is similar to the welding situation shown in FIG. 1a. By contrast to the arrangement from FIG. 1a, the second (narrower) workpiece part 3b extends perpendicularly away from the abutting area 10, and the first (wider) workpiece part 3a extends parallel to the abutting area 10. The thinner, second workpiece part 3b extends in particular perpendicularly to the thicker, first workpiece part 3a. The thinner, second workpiece part 3b is in particular welded to the side of the thicker, first workpiece part 3a. The extension of the longitudinal axis 7b of the second workpiece part 3b passes through the end 5b of the first workpiece part 3a.

Figure 1C:
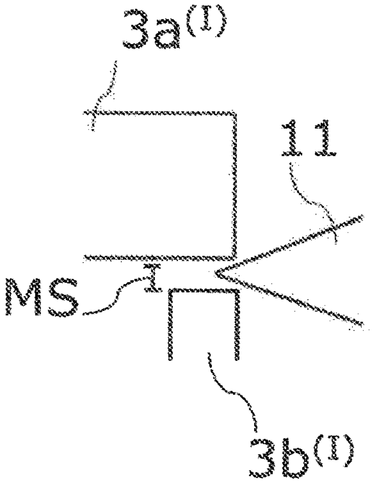
FIG. 1*c* shows a schematic view of a first and a second workpiece part in a corner-shaped arrangement with a gap in a welding situation according to embodiments the present invention.

FIG. 1c shows by way of example a schematic view of a first and a second workpiece part $3a^{(I)}$, $3b^{(I)}$ arranged in a corner shape in a welding situation according to embodiments of the present invention, which workpiece parts are arranged with a maximum gap width MS of 0.1 mm between the workpiece parts $3a^{(I)}$, $3b^{(I)}$, and with a welding laser beam 11. It should be noted that the gap width MS and the beam divergence of the welding laser beam 11 are greatly exaggerated (the same also applies correspondingly for the other figures).

Figure 1D:
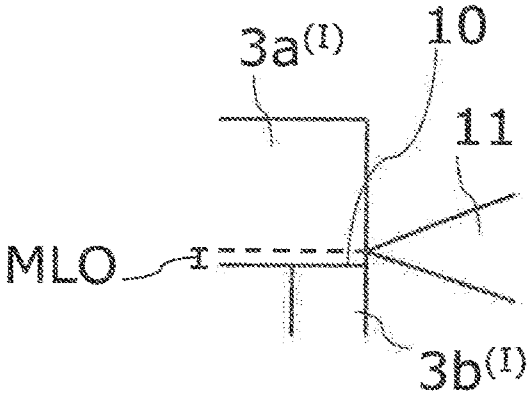
FIG. 1*d* shows a schematic view of a welding situation according to embodiments of the present invention with a first and a second workpiece part in a corner-shaped arrangement, the laser beam being offset along the surface of the workpiece parts with respect to the abutting area of the workpiece parts.

FIG. 1d shows by way of example a schematic view of a welding situation with a first and a second workpiece part $3a^{(I)}$, $3b^{(I)}$ in a corner-shaped arrangement, the welding laser beam 11 being offset along the surface of the workpiece parts $3a^{(I)}$, $3b^{(I)}$ in relation to the abutting area 10 of the workpiece parts $3a^{(I)}$, $3b^{(I)}$. The welding laser beam 11 has in particular a maximum lateral offset MLO of 0.2 mm with respect to the abutting area 10 of the workpiece parts $3a^{(I)}$, $3b^{(I)}$.

Figure 1E:
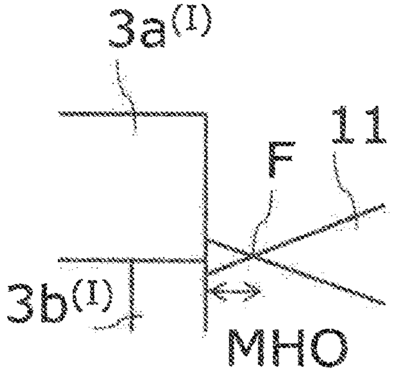
FIG. 1*e* shows a schematic view of a welding situation according to embodiments of the present invention with a first and a second workpiece part in a corner-shaped arrangement, the focus of the laser beam being spaced apart from the surface of the workpiece parts.
Figure 1F:
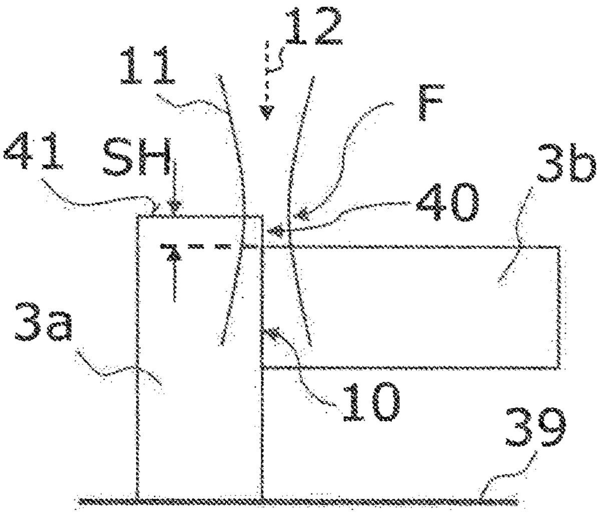
FIG. 1*f* shows a schematic view of a welding situation according to embodiments of the present invention with a first and a second workpiece part in a corner-shaped arrangement, the workpiece parts forming a step.

FIG. 1e shows by way of example a schematic view of a welding situation with a first and a second workpiece part $3a^{(I)}$, $3b^{(I)}$ in a corner-shaped arrangement, the focus F of the welding laser beam 11 being spaced apart upwardly from the surface of the workpiece parts $3a^{(I)}$, $3b^{(I)}$. The focus F of the welding laser beam 11 for welding the workpiece parts $3a^{(I)}$, $3b^{(I)}$ together has in particular a maximum height offset MHO in relation to the surface of the workpiece of 1.5 mm. It should be noted that a height offset MHO may also be set up in that the focus F lies below the surface of the workpieces (not illustrated in more detail).

Figure if shows by way of example a schematic view of a welding situation, as frequently arises when welding a battery housing as a result of joining tolerances. The first workpiece part 3a is aligned vertically in this instance and sits on a base 39; it is formed by the can of the battery housing or by a part of the can. This can should be closed by means of a cap. The second workpiece part 3b forms this cap or part of it. The workpiece parts 3a, 3b should be welded to one another in a gastight manner at the abutting area 10 thereof.

In the direction of the (in this instance) vertical beam propagation direction 12, in which the welding laser beam 11 propagates, the workpiece parts 3a, 3b are in this instance arranged slightly offset; correspondingly, a step 40 is formed adjacent to the abutting area 10. The step height SH of the step 40 in the direction R is typically at most 0.3 mm, preferably at most 0.1 mm.

The focus F of the welding laser beam 11 is typically oriented at the edge of the surface 41, facing the incident welding laser beam 11, of the first workpiece part 3a, which is standing on the base 39, in this instance without a height offset. The focus F can be seen here by virtue of the constriction of the lateral boundary lines of the welding laser beam 11.

Figure 2:
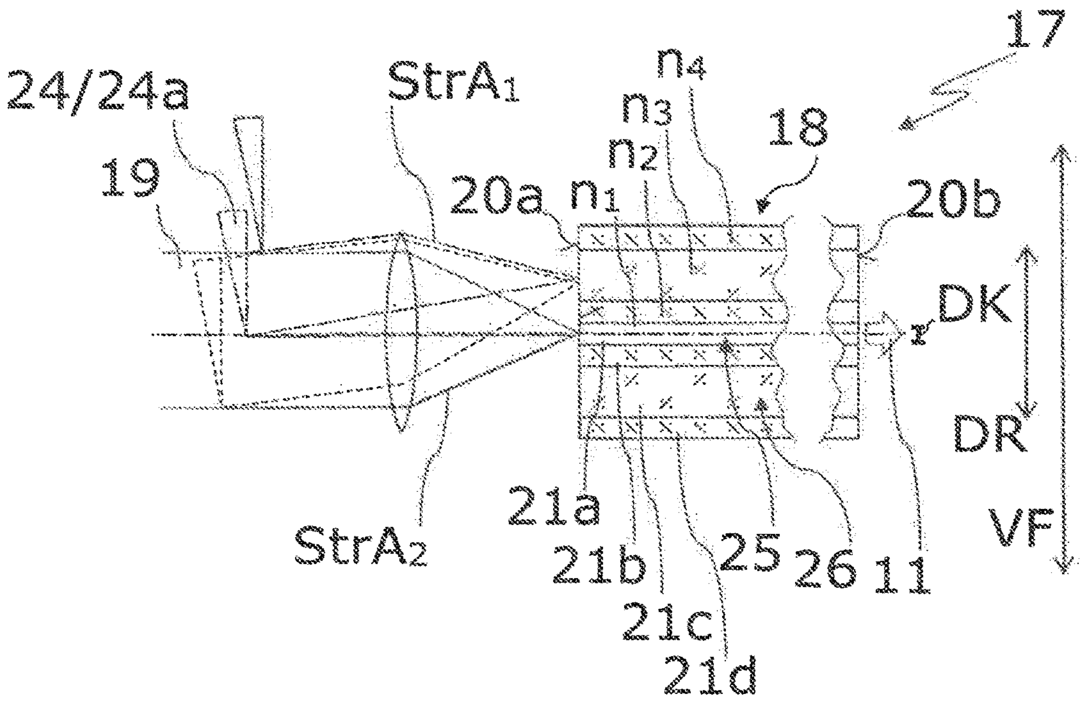
FIG. 2 shows an arrangement for generating a laser beam by means of a multiclad fiber for embodiments of the present invention.

FIG. 2 shows a laser system 17 for generating a welding laser beam 11 by means of a multiclad fiber 18. An output laser beam 19 is coupled into a first fiber end 20a of the multiclad fiber 18, which in the radial direction has layers 21a, 21b, 21c, 21d with different refractive indices $n_1$, $n_2$, $n_3$, $n_4$. Furthermore, the welding laser beam 11 is coupled out of a second end 20b of the multiclad fiber 18. The beam profile of the exiting welding laser beam 11 is modified by coupling the output laser beam 19 at least into an inner core fiber 25, having the diameter DK, of the multiclad fiber 18 and into an outer ring fiber 26, having the diameter DR, of the multiclad fiber 18 by virtue of a deflection optical unit 24, in this instance configured as an optical wedge 24a, having different power output fractions LK, LR. In this case, in the center position of the optical wedge 24a, a beam fraction $StrA_1$ of the output laser beam 19 is deflected by the optical wedge 24a and fed into the layer 21c, whereas a second beam fraction $StrA_2$ of the output laser beam 19 propagates, still undistorted, in a straight line upstream of the optical wedge 24a with respect to the beam direction of the output laser beam 19 and is fed into the layer 21a. In the embodiment shown, the multiclad fiber 18 is in the form of a 2-in-1 fiber with the inner core fiber 25 and the outer ring fiber 26. The inner core fiber 25 is formed in particular by the layer 21a and the ring fiber 26 is formed in particular by the layer 21c. The other layers 21b, 21d serve as linings in order to prevent the beam fractions $StrA_1$, $StrA_2$ from passing through between the inner core fiber 25 and the outer ring fiber 26. In particular, the refractive index $n_1$ of the layer 21a and the refractive index $n_3$ of the layer 21c are greater than the refractive index $n_2$ of the layer 21b and the refractive index $n_4$ of the layer 21d. The second end 20b of the multiclad fiber 18 is reproduced enlarged on the workpiece (see FIG. 1a), in particular with an enlargement factor VF of greater than 2.0 (not illustrated in any more detail).

Figure 3A:
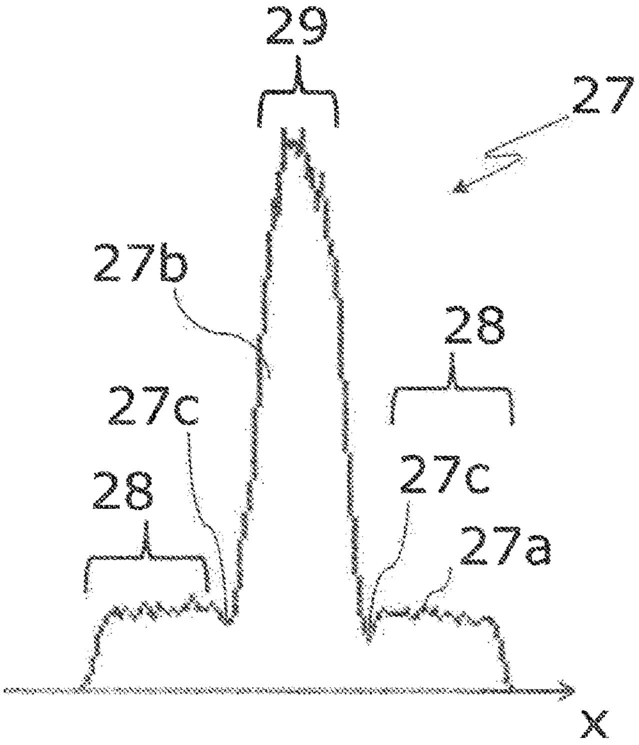
FIG. 3*a* shows the schematic intensity profile of a laser beam, coupled out of a multiclad fiber as illustrated in FIG. 2, in a direction transverse to the propagation direction of the laser beam for embodiments of the present invention.

FIG. 3a shows the profile of the intensity 27 of a welding laser beam 11 coupled out of a multiclad fiber 18 (see e.g. FIG. 2) in a direction x transverse with respect to the propagation direction of the welding laser beam 11 close to the surface 9 of the workpiece (see FIG. 1a) with the focus within the preferred maximum height offset MHO with respect to the surface 9 of the workpiece of 1.5 mm (see FIG. 1c). The intensity 27a of the ring beam 28, that is to say of the laser beam from the ring fiber 26 (see FIG. 2), drops in this instance in the direction of the core beam 29, that is to say of the laser beam from the core fiber 25 (see FIG. 2), and outwardly, in the radial direction away from the core beam 29. In between, the intensity 27*a* of the ring beam 28 is approximately constant. The intensity 27*b* of the core beam 29 is higher than that of the ring beam 28. There is therefore a local minimum 27*c* of the intensity 27 between the ring beam 28 and the core beam 29.

Figure 3B:
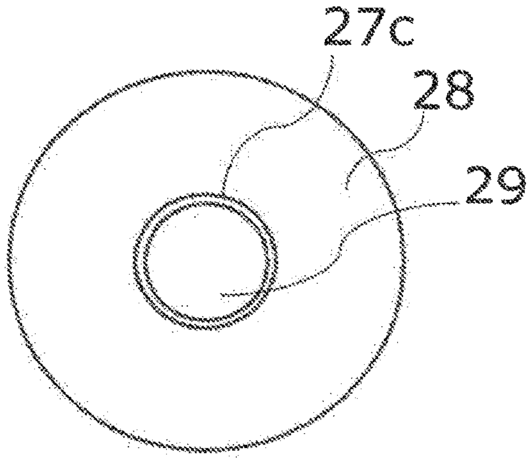
FIG. 3*b* schematically shows an areal cross section of the laser beam, coupled out of the multiclad fiber, of FIG. 3*a* transversely to the propagation direction of the laser beam.

FIG. 3*b* schematically shows an areal cross-section of the welding laser beam 11, coupled out of the multiclad fiber 18, of FIG. 3*a* transverse with respect to the propagation direction of the welding laser beam 11 close to the surface of the workpiece within the preferred maximum height offset MHO with respect to the surface of the workpiece of 1.5 mm, with the ring beam 28, the core beam 29 and the local minimum of the intensity 27*c* between the ring beam 28 and the core beam 29. The profiles of ring beam 28 and core beam 29 may each also have a different shape, for example be quadrilateral. The integration of the intensity by way of the core beam 29 results in the beam power output of the core beam 29, which is in particular 25% to 50% of the overall power output of the welding laser beam 11.

Figure 4:
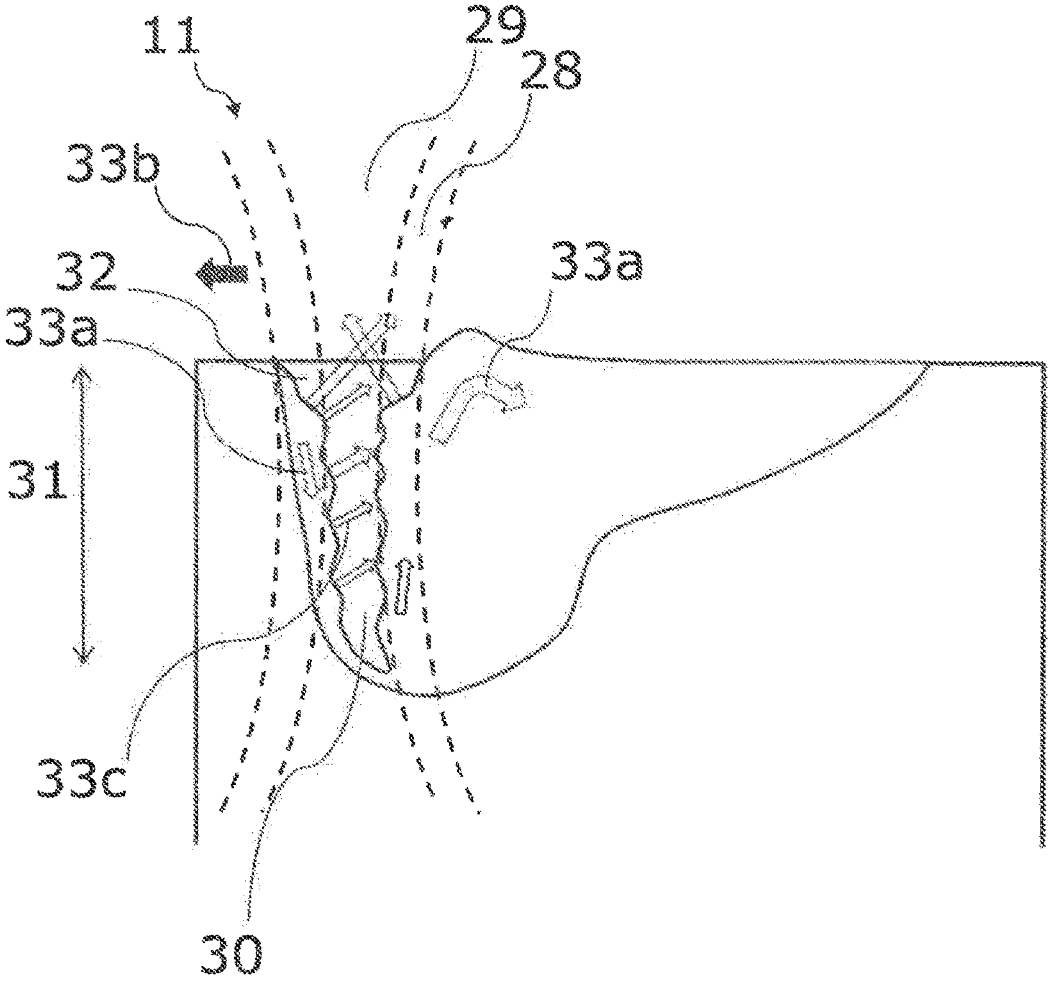
FIG. 4 shows a schematic illustration of a weld pool and a vapor capillary during the welding method according to embodiments of the present invention and with the laser beam coupled out of the multiclad fiber.

FIG. 4 shows a schematic illustration of the weld pool and the vapor capillary 30 located therein during the welding method according to embodiments of the present invention by means of a laser beam coupled out of the multiclad fiber (see FIG. 3). The core beam 29 substantially determines the depth 31 of the vapor capillary 30. The melt flows at the front side of the vapor capillary 30, downwardly with respect to the advancement direction 33*b* of the welding laser beam 11, toward the base of the vapor capillary 30. At the rear side of the vapor capillary 30, the melt flows upwardly and then rearwardly away from the welding laser beam 11. The ring beam 28 enlarges the opening 32 in the vapor capillary 30 and facilitates the emergence of gases from the vapor capillary 30. The dynamic pressure of the gas produced during the welding method and therefore the respective pulse transmitted by the gas particles to the melt is lower. This reduces the flow velocity in the melt. Less spatters of the melt are ejected during the welding method. Moreover, the ring beam 28 acts on the melt by way of a pulse, which is directed counter to the flow direction of the melt toward the surface of the vapor capillary 30 and likewise counteracts the ejection of spatters. The flow direction 33*a* of the molten material is indicated schematically by non-solid arrows. The gas flow in the vapor capillary 30 is marked by arrows 33*c*.

Figure 5A:
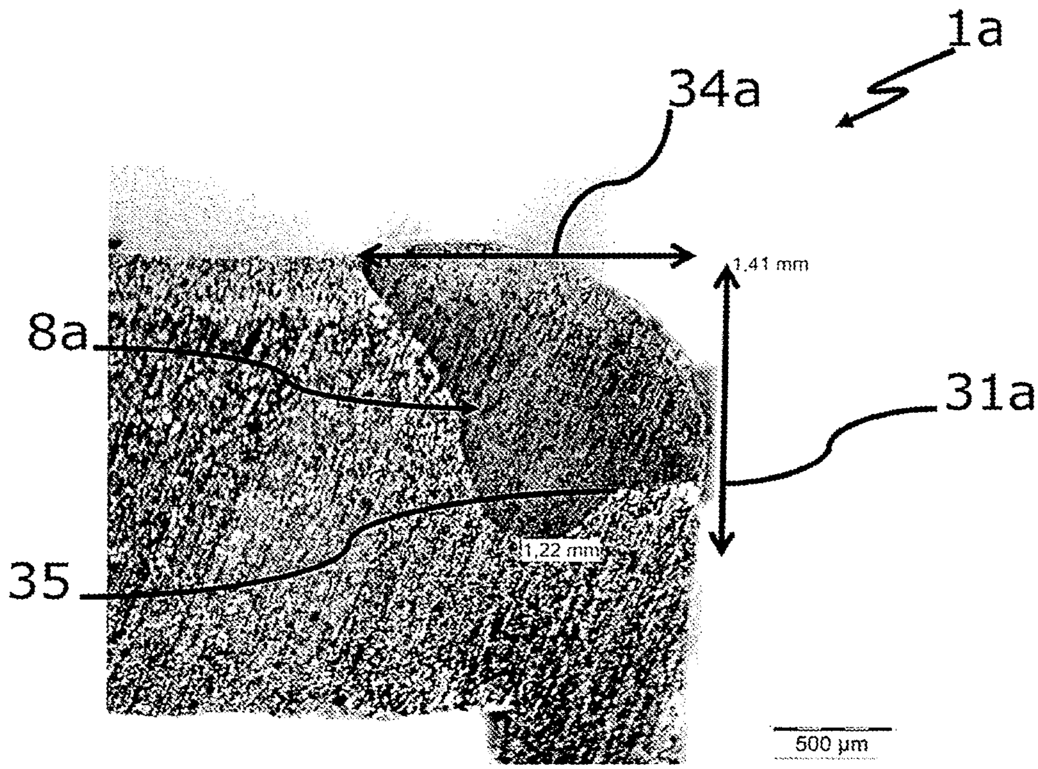
FIG. 5*a* shows a sectional view through a welded workpiece at a corner joint in the region of the weld, which was created by means of a laser beam that was coupled out of a single-core fiber.

FIG. 5*a* shows a sectional view through a welded workpiece 1*a* with a plain butt joint weld 8*a*, which was created by a laser beam that was coupled out of a single-core fiber. The width 34*a* and depth 31*a* of the weld 8*a* is illustrated by bars. The weld 8*a* has a comparatively small width 34*a* (cf. FIG. 5*b*) of 1.41 mm along with a depth 31*a* of the weld 8*a* of 1.22 mm. The vapor capillary that created the weld had a corresponding relatively small width, with the result that gases produced during the laser welding could escape only comparatively slowly from the vapor capillary. An edge 35 formed by the beam profile makes it more difficult for molten material to flow away from the laser beam further outward. The excess pressure generated during the welding forms protuberances of the vapor capillaries that are part of the weld 8*a* and spatters are ejected. The weld 8*a* additionally has a comparatively high degree of humping.

Figure 5B:
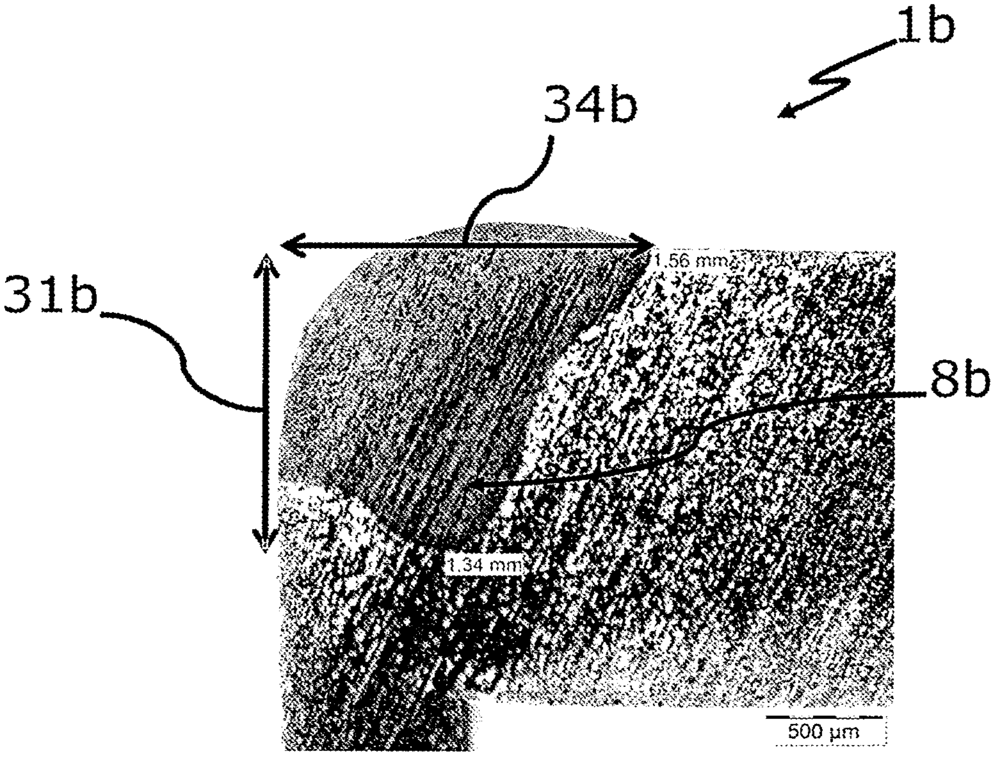
FIG. 5*b* shows a sectional view through a welded workpiece at a corner joint in the region of the weld, which was created according to embodiments of the present invention by means of a laser beam that was coupled out of a multiclad fiber.

FIG. 5*b* shows a sectional view through a welded workpiece 1*b* with a plain butt joint weld 8*b*, which was created by a laser beam that was coupled out of a multiclad fiber (see FIG. 2). The weld 8*b* has a larger width 34*b* of 1.56 mm than the weld 8*a* shown in FIG. 5*a*, along with a depth 31*b* of the weld 8*b* of 1.34 mm. The vapor capillary that created the weld had a corresponding larger width, with the result that gases produced during the laser welding could escape comparatively easily from the vapor capillary. This prevents excess pressure in the vapor capillary that is part of the weld 8*b* and suppresses spatters. The weld 8*b* additionally has a comparatively low degree of humping.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for laser welding of a workpiece, the method comprising:

welding at a corner joint of two workpiece parts of the workpiece by a welding laser beam, to create an aluminum connection between the two workpiece parts, feeding an output laser beam into a first end of a multiclad fiber to generate the welding laser beam, wherein the multiclad fiber comprises at least a core fiber and a ring fiber surrounding the core fiber, wherein a first portion LK of a laser power output of the output laser beam is fed into the core fiber and a second portion LR of the laser power output of the output laser beam is fed into the ring fiber, and wherein a second end of the multiclad fiber is reproduced on the workpiece, and welding the two workpiece parts of the workpiece by deep welding using the welding laser beam, wherein the two workpiece parts bear against each other at an abutting area lying parallel to a beam propagation direction of the welding laser beam, wherein surfaces of the two workpiece parts at an entrance side of the welding laser beam are flush with each other, the beam propagation direction of the welding laser beam being perpendicular to the surfaces, and wherein the welding laser beam has a finite lateral offset on the workpiece with respect to the abutting area of the workpiece parts, with a maximum lateral offset MLO that satisfies $|MLO| \leq 0.2$ mm.

2. The method of as claimed in claim 1, wherein the multiclad fiber comprises a 2-in-1 fiber.

3. The method as claimed in claim 1, wherein the first portion LK of the laser power output for the core fiber and the second portion LR of the laser power output for the ring fiber are selected with $$0.15 \leq LK/(LK+LR) \leq 0.50.$$

4. The method as claimed in claim 3, wherein the first portion LK of the laser power output for the core fiber and the second portion LR of the laser power output for the ring fiber are selected with $$0.25 \leq LK/(LK+LR) \leq 0.45.$$

5. The method as claimed in claim 4, wherein the first portion LK of the laser power output for the core fiber and the second portion LR of the laser power output for the ring fiber are selected with $$LK/(LK+LR)=0.35.$$

6. The method as claimed in claim 1, wherein the laser welding is effected at an advancement speed v with $$v \geq 7 \text{ m/min.}$$

7. The method as claimed in claim 6, wherein the laser welding is effected at the advancement speed v with v≥10 m/min.

8. The method as claimed in claim 7, wherein the laser welding is effected at the advancement speed v with v≥20 m/min.

9. The method as claimed in claim 7, wherein the laser welding is effected at the advancement speed v with v≥30 m/min.

10. The method as claimed in claim 1, wherein the second end of the multiclad fiber is reproduced on the workpiece enlarged by an enlargement factor VF, with VF>1.0.

11. The method as claimed in claim 10, wherein the second end of the multiclad fiber is reproduced on the workpiece enlarged by the enlargement factor VF, with VF≥1.5.

12. The method as claimed in claim 11, wherein the second end of the multiclad fiber is reproduced on the workpiece enlarged by the enlargement factor VF, with VF≥2.0.

13. The method as claimed in claim 1, wherein the output laser beam is generated by a solid-state laser.

14. The method as claimed in claim 1, wherein the multiclad fiber is selected such that, for a diameter DK of the core fiber and a diameter DR of the ring fiber, the following holds true:

$$2.5 \leq DR/DK \leq 6.$$

15. A method for laser welding of a workpiece, the method comprising:

welding at a corner joint of two workpiece parts of the workpiece by a welding laser beam, to create an aluminum connection between the two workpiece parts, feeding an output laser beam into a first end of a multiclad fiber to generate the welding laser beam, wherein the multiclad fiber comprises at least a core fiber and a ring fiber surrounding the core fiber, wherein a first portion LK of a laser power output of the output laser beam is fed into the core fiber and a second portion LR of the laser power output of the output laser beam is fed into the ring fiber, and wherein a second end of the multiclad fiber is reproduced on the workpiece, and welding the two workpiece parts of the workpiece by deep welding using the welding laser beam, wherein the two workpiece parts bear against each other at an abutting area lying parallel to a beam propagation direction of the welding laser beam, wherein surfaces of the two workpiece parts at an entrance side of the welding laser beam are flush with each other, the beam propagation direction of the welding laser beam being perpendicular to the surfaces, wherein the welding laser beam with its focus in a beam propagation direction has a finite height offset above the surfaces of the two workpiece parts, with a maximum height offset MHO that satisfies |MHO|≤1.5 mm.

16. The method as claimed in claim 1, wherein the two workpiece parts are parts of a battery housing.

17. The method as claimed in claim 16, wherein one of the two workpiece parts is a cap which closes off the battery housing.

* * * * *